Figure 3:
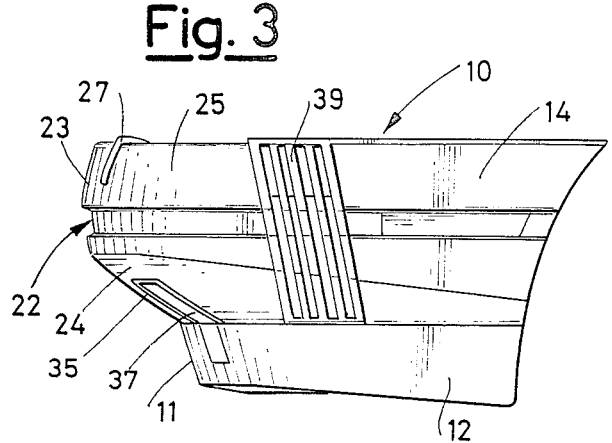

United States Patent [19]

Ghezzi et al.

[11] Patent Number: 4,758,034
[45] Date of Patent: Jul. 19, 1988

[54] SHOCK-ABSORPTION DEFORMABLE BUMPER FOR MOTORCARS

[75] Inventors: Lucio Ghezzi; Ermanno Cressoni, both of Milan, Italy

[73] Assignee: Alfa Romeo Auto S.p.A., Naples, Italy

[21] Appl. No.: 942,617

[22] Filed: Dec. 17, 1986

[30] Foreign Application Priority Data

Dec. 24, 1985 [IT] Italy .................... 24252/85[U]

[51] Int. Cl.⁴ .................. B60R 19/26; B60R 19/04
[52] U.S. Cl. ............................ 293/132; 293/154; 296/1 S; 362/80; 362/82
[58] Field of Search .............. 293/109, 120, 132, 134, 293/136, 126, 149, 151–154; 296/1 S, 194, 195; 362/80, 82

[56] References Cited

U.S. PATENT DOCUMENTS

| | | | |
|---|---|---|---|
| 3,884,516 | 5/1975 | Gallion et al. | 293/120 |
| 4,059,301 | 11/1977 | Meyer | 293/126 |
| 4,398,764 | 8/1983 | Okuyama | 296/1 S |
| 4,402,537 | 9/1983 | Gallitzendorfer et al. | 293/149 |
| 4,597,603 | 7/1986 | Trabert | 296/194 |
| 4,653,795 | 3/1987 | Soderberg | 296/1 S |

FOREIGN PATENT DOCUMENTS

| | | | |
|---|---|---|---|
| 3247989 | 6/1984 | Fed. Rep. of Germany | 296/194 |
| 2454388 | 12/1980 | France | 362/82 |

Primary Examiner—Dennis H. Pedder
Attorney, Agent, or Firm—Charles E. Brown; Charles A. Brown

[57] ABSTRACT

Shock absorption deformable bumper for motorcars, with absorbers for the shock energy of up to a prefixed speed, characterized in that it is formed by a stationary body and a movable body, wherein the stationary body is suitably to be solidly fastened to the motorcar bodywork, and is constituted by a transverse spoiler which extends into two longitudinal wings, and wherein the movable body is constituted by a substantially transversal shield, suitable to be connected to the bodywork by means of shock energy absorbers.

8 Claims, 4 Drawing Sheets

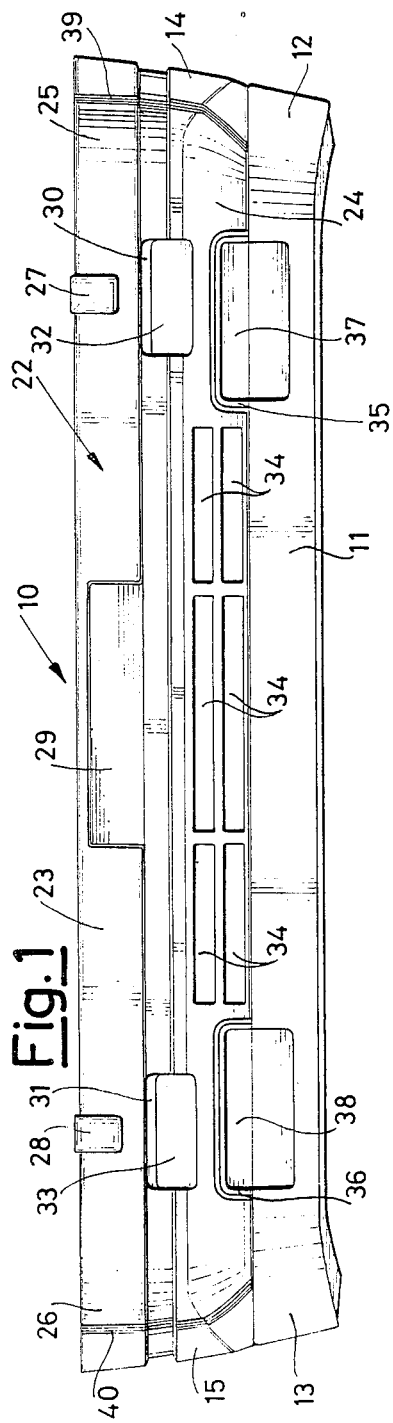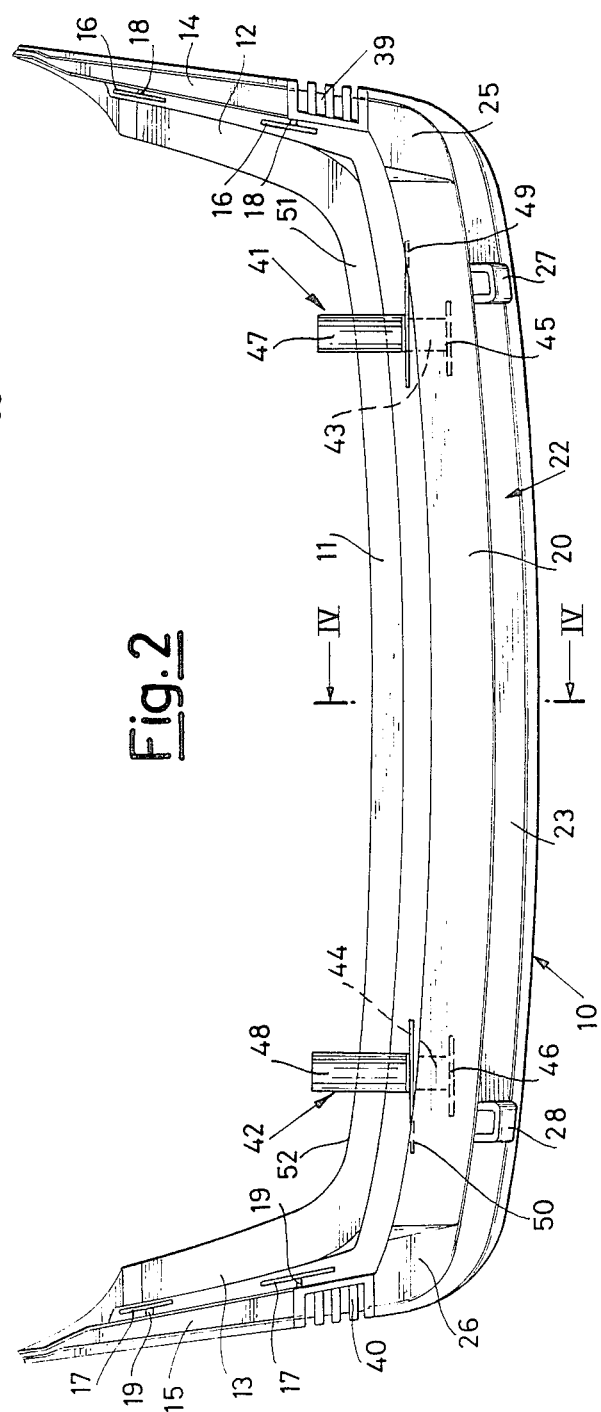

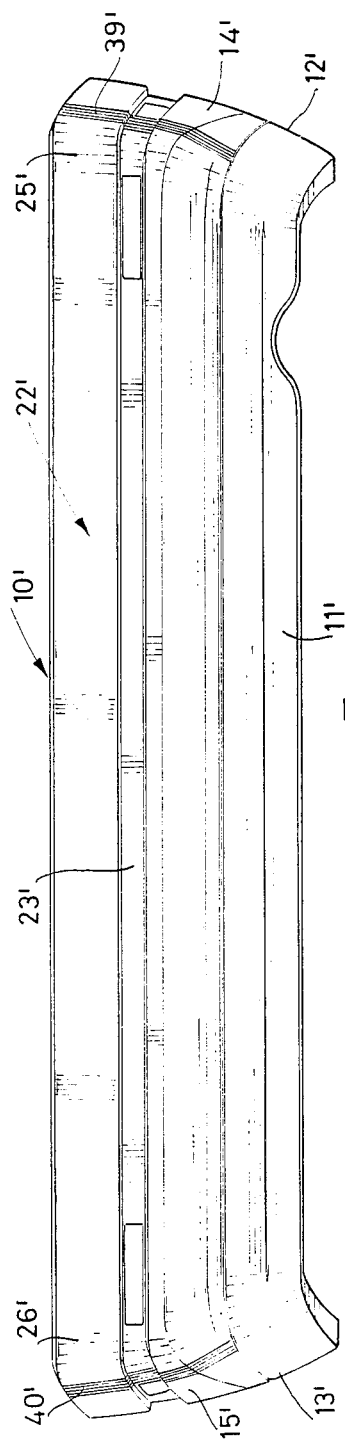
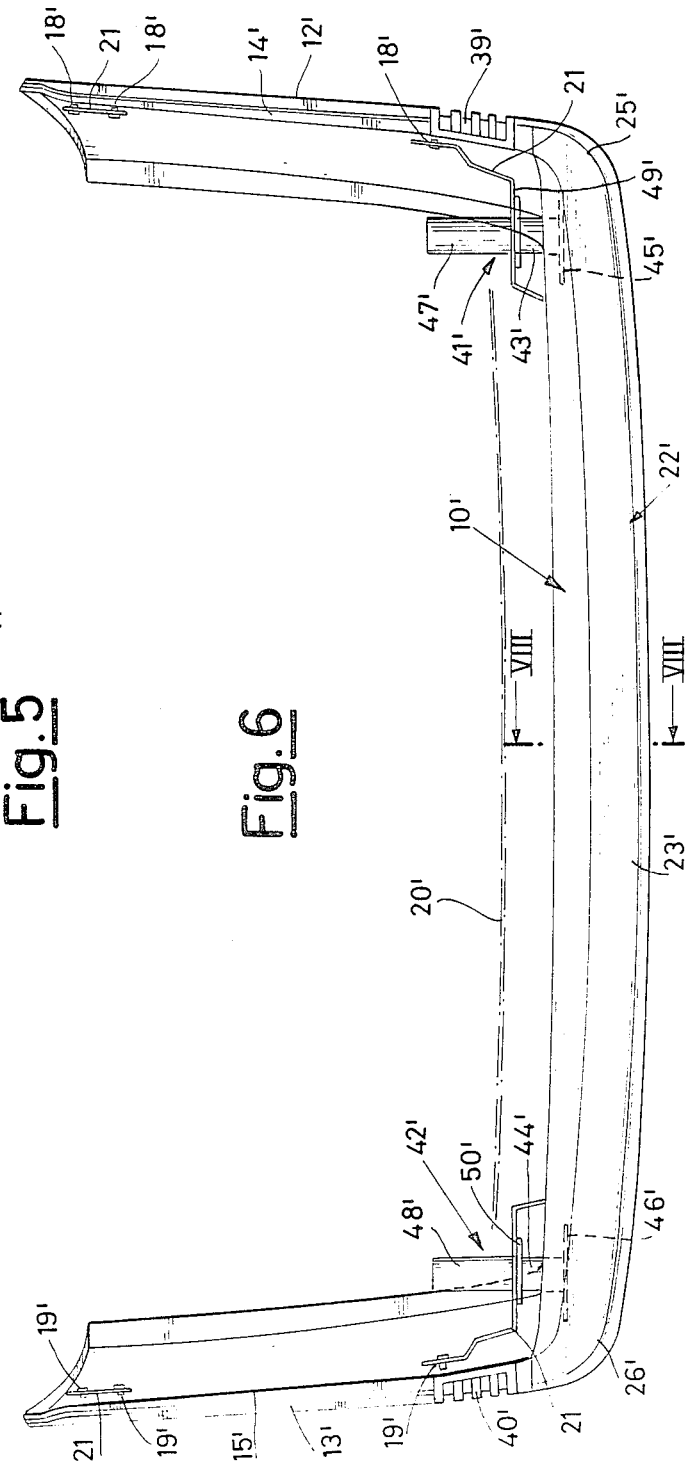
Fig.5
Fig.6

SHOCK-ABSORPTION DEFORMABLE BUMPER FOR MOTORCARS

The present invention relates to a bumper of deformable type for motorcars, and, in particular, it relates to a bumper provided with absorbers (or absorption means) for the energy being evolved in case of low-speed shocks.

The bumpers of this type have, above all, the purpose of absorbing, in an elastic fashion, the most of the kinetic energy which is evolved due to the effect of shocks up to a prefixed speed threshold; that, to the purpose of avoiding that the same bumpers may undergo rebounds, as it would to the contrary occur if they could return to the car all of the energy stored in primitive form.

Besides dissipating or absorbing in an irreversible way a portion of the shock energy, the bumpers of the type as described are required to be able, after the shocks up to a determined speed, to returning back to their original conditions, so to be able to withstand further shocks and to again efficaciously absorb the prescribed aliquot of the related kinetic energy.

Thus, the absorbers or the absorption devices are formed by means for energy dissipation (by friction, by fluid flow and the like) and by elastic means (metal, rubber, compressed-air springs, and the like).

Generally, the energy absorbers are interposed between the bumper and the bodywork of the motorcar and are accomplished by hydraulic shock absorbers incorporating metal springs, with telescopic supports of the oleopneumatic type, with rubber elements having suitable viscoelastic characteristics in order them to be able to retract and to extend according to the prescribed modalities.

Purpose of the present invention is to improve the bumpers of the described type, reducing the problems connected to the anchoring of the bumper to the bodywork of the motorcar, and those relating to the positioning of the energy absorbers.

In view of such a purpose, the Applicant has devised to render movable one part only of the bumper, and precisely that part which has the prevailing function of absorbing the kinetic energy due to the longitudinal components of the shock forces.

The above involves mainly the advantage that one can simplify the system for anchoring the bumper to the bodywork; furthermore, it allows the inertia of the movable portion of the bumper, and, consequently, the size, weight and cost of the energy absorbers, to be reduced, with the efficiency of the same bumper remaining the same.

More particularly, a deformable bumper has been provided, which is formed by a stationary body and a movable body, wherein the stationary body is suitable to be made integral with the motorcar bodywork, and is constituted by a transverse spoiler which extends into two longitudinal wings, and wherein the movable body is constituted by a substantially transverse shield, suitable to be connected to the bodywork by means of shock energy absorbers.

Preferably, the above-said shield is laterally provided with angle bars which are connected, by means of bellows connexions, to side guard panels integral with the longitudinal wings; the same shield is furthermore superimposed to the spoiler, and protrudes relatively to it.

By this solution, the side panels, which are stationary, performs the customary action of protecting the car sides, and the shield, which is the only movable portion of the bumper, is able to absorb the kinetic energy due to the longitudinal shocks up to a determined speed, besides offering the usual protection of the front or of the rear of the car.

Characteristics and advantages are now illustrated with reference to FIGS. from 1 to 8, wherein preferred practical embodiments of the same invention are shown to exemplifying, non-limitative purposes.

In FIGS. from 1 to 4, a front bumper accomplished according to the invention is shown, respectively in front view, top view, side view and sectional view according to path plane IV—IV of FIG. 2;

In FIGS. from 5 to 8, a rear bumper, it too accomplished according to the invention, is respectively shown in front view, top view, side view and sectional view, according to path plane VIII—VIII of FIG. 6.

In FIGS. from 1 to 4, with 10 a deformable front bumper of a motorcar is generally shown; with 11 a transverse spoiler is indicated, which extends into two longitudinal wings 12 and 13, with which two side guard panels, respectively 14 and 15, are integral. Both the spoiler 11 and the panels 14 and 15 are preferably made from semirigid plastic material. The wings 12 and 13 are fastened to the brackets 16 and 17 of the bodywork, partly shown in FIG. 2, by means of bolts 18, 19.

Figure 4:
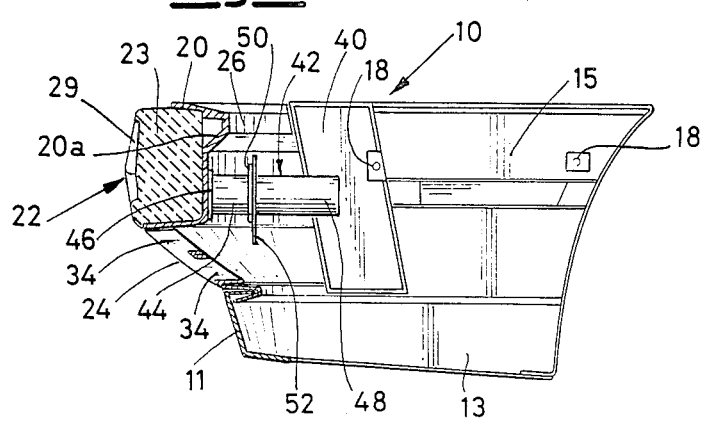
Figure 7:
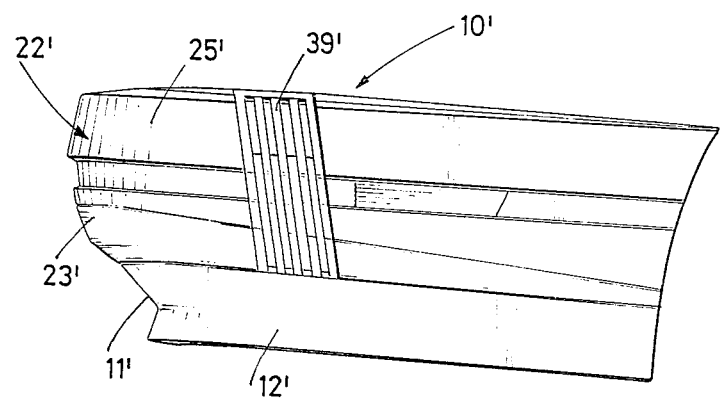
Figure 8:
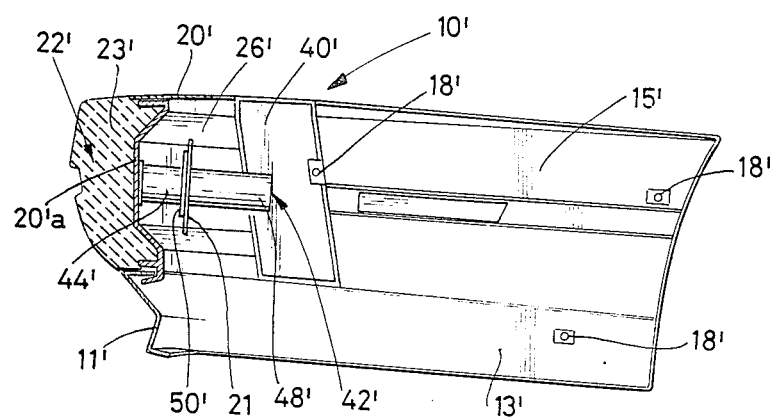

With 22 generally indicated is a movable shield, formed by a box-type crossbeam 23 and by and underlying apron 24, which end laterally with angle bars 25 and 26, and protrude forwards relatively to the spoiler 11, as shown in FIGS. 3 and 4. Both the crossbeam 23 and the apron 24 are made from a rigid plastic material, and the crossbeam is preferably filled with foamed plastic material. On the crossbeam 23 headlights cleaning devices 27 and 28 are installed, and a hollow 29 to house the license plate and seats 30 and 31 to house the parking lights 32 and 33 are provided. In the apron 24 a grid of ports 34 is provided, which allow the engine compartment cooling air to reach this latter.

In the apron 24 also openings 35 and 36 are provided, into which the shells 37 and 38, integral with the spoiler 11, which house fog lights, not shown, partly penetrate.

The shield 22 is resting against the spoiler 11, as it results from FIG. 4, and is connected to the side panels 14 and 15 by means of bellows connexions 39 and 40, made, e.g., from rubber. To the upper portion of the crossbeam 23 a thin ornamental sheet, indicated 20, made integral with a section 20a, situated on the rear side of the crossbeam 23, is fastened.

The shield 22 is constrained to the bodywork by means of energy absorbers 41 and 42, which, in this particular case, are of telescopic and oleopneumatic type. The absorbers 41 and 42 comprise a stem, respectively 43 and 44, which is bolted onto the crossbeam by means of a related flange 45 and 46, and screw studs, not shown, integral with the same crossbeam; the absorbers 41 and 42 comprise also respective cylinders 47 and 48 which, by means of flanges 49 and 50 and related bolts, not shown, are fastened to the metal-plate brackets 51 and 52 of the bodywork.

Inasmuch as the absorbers are of known type, the inner structural details thereof are not illustrated.

In case of a shock up to a determined speed, the shield 22, formed by the crossbeam 23 and the apron 24, is able to absorb the kinetic energy due to the longitudinal speed components, because it moves backwards, making absorbers 41 and 42 retract.

Thereby a compression results of the elastic means, in this particular case of pneumatic type, of the absorbers 41 and/or 42, which thus accumulate energy in elastic form.

Upon the absorbers extending, a large portion of this energy is dissipated by oil flow through the shock absorber means of the same absorbers, whilst the residual portion serves to bring back the absorbers to their original condition, to be able to withstand further shocks.

Therefore, by means of the bumper as disclosed, the wings 12 and 13, as well as the panels 14 and 15 perform the usual task of protection of the sides of the motorcar, and the shield 22 performs, in combination, the usual action of protecting the motorcar front, and the particular task of absorbing the shock energy.

The spoiler 11 performs the usual task of acting as an aerodynamic appendix, and serves to reduce the resistance to the motorcar travelling, and to improve the adherence thereof, at the high travelling speeds.

Furthermore, the fog lights housing seats are provided in the spoiler 11, so that the same lights can be advantageously mounted in a stationary, and also shock-protected, body.

In FIGS. from 5 to 8, shown is a deformable rear bumper, realized according to the same criteria as the front bumper shown in FIGS. from 1 to 4, but with an obviously different shape, and without certain fittings that latter is provided with; thus, the common elements are indicated with the same numerals, provided with an apex.

In this case, the shield 22' is formed by the only box-type crossbeam 23' and the ornamental sheet 20' is fastened onto the bodywork by screws, not shown.

Furthermore, the wings 12' and 13' and the panels 14' and 15' are fastened to the metal plates 21 of the bodywork (only partly shown) by means of the bolts 18' and 19' and the absorbers 41' and 42' are fastened to the shield 22' and to the metal plates 21 of the bodywork (always in partial view), by means of screws and bolts not shown.

In case of a shock, the rear bumper 10' performs the same tasks as the front bumper, 10, and behaves in the same way as that.

We claim:

1. Shock absorption deformable bumper for a motorcar, with absorbers of the shock energy type for absorbing impact energy, said deformable bumper being formed by a stationary body and a movable body, the stationary body being suitable to be solidly fastened onto bodywork of the motorcar and being constituted by a transverse spoiler which extends into two longitudinal wings, and the movable body being constituted by a substantially transverse shield, suitable to be connected to the bodywork by means of said shock energy absorbers, said shield is laterally provided with angle bars which are connected, by means of bellows connections, to side guard panels integral with said longitudinal wings.

2. Deformable bumper according to claim 1, wherein said shield is superimposed to said spoiler, and protrudes relatively to it.

3. Deformable bumper according to claim 1, wherein said bumper comprises a box-type crossbeam, made from rigid plastic material.

4. Deformable bumper according to claim 3, wherein said shield further comprises an apron integral with a bottom portion of said shield and with said box-type crossbeam, which is also made from rigid plastic material.

5. Deformable bumper according to claim 4, wherein said apron is provided with a grid of ports allowing air to pass through.

6. Deformable bumper according to claim 1, wherein said shield comprises an apron connected to the bodywork by said shock energy absorbers which are of telescopic and oleopneumatic type.

7. Shock absorption deformable bumper for a motorcar, with absorbers of the shock energy type for absorbing impact energy, said deformable bumper being formed by a stationary body and a movable body, the stationary body being suitable to be solidly fastened onto bodywork of the motorcar and being constituted by a transverse spoiler which extends into two longitudinal wings, and the movable body being constituted by a substantially transverse shield, suitable to be connected to the bodywork by means of said shock energy absorbers, said spoiler has integral shells for housing fittings, such as fog lights, and said shield has openings provided, in which the said shells partially penetrate.

8. Shock absorption deformable bumper for a motorcar, said deformable bumper having shock energy absorbers for absorbing impact energy, said deformable bumper being formed by a stationary body and a movable body, said stationary body being solidly fastened onto bodywork of the motorcar, said stationary body having a substantially transverse spoiler which extends into two longitudinal wings, said movable body having a substantially transverse shield connected to the bodywork by said shock energy absorbers, said shield being provided laterally with portions extending in the longitudinal direction of the motorcar and said portions being connected with side guard panels of said deformable bumper by means of bellows connection above said longitudinal wings of said stationary body, and said side guard panels being fixed to said bodywork.

* * * * *